United States Patent [19]

Ohmori

[11] 4,261,502
[45] Apr. 14, 1981

[54] LIQUID CONTAINER SEALING CONSTRUCTION

[75] Inventor: Koichiro Ohmori, Tokyo, Japan

[73] Assignee: Honshu Paper Company, Tokyo, Japan

[21] Appl. No.: 68,026

[22] Filed: Aug. 20, 1979

Related U.S. Application Data

[63] Continuation of Ser. No. 965,715, Dec. 1, 1978, abandoned, which is a continuation of Ser. No. 886,383, Mar. 14, 1978, abandoned, which is a continuation of Ser. No. 804,212, Jun. 7, 1977, abandoned, which is a continuation of Ser. No. 670,107, Apr. 19, 1976, abandoned.

[51] Int. Cl.³ .......................... B65D 3/12; B65D 3/02
[52] U.S. Cl. ..................................... 229/1.5 B; 229/4.5
[58] Field of Search ........................... 229/1.5 B, 4.5

[56] References Cited

U.S. PATENT DOCUMENTS

| | | | |
|---|---|---|---|
| 2,467,016 | 4/1949 | Dunlap | 229/4.5 X |
| 2,917,215 | 12/1959 | Psaty et al. | 229/1.5 B |
| 3,049,277 | 8/1962 | Shappell | 229/1.5 B |
| 3,137,431 | 6/1964 | Crouse et al. | 229/1.5 B |
| 3,182,882 | 5/1965 | Aellen, Jr. et al. | 229/4.5 |
| 3,215,325 | 11/1965 | Shappell et al. | 229/1.5 B |
| 3,312,383 | 4/1967 | Shapiro et al. | 229/1.5 B |

*Primary Examiner*—Davis T. Moorhead
*Attorney, Agent, or Firm*—William A. Drucker

[57] ABSTRACT

A liquid container sealing construction comprises a container body having at least one open end surrounded by a marginal edge thereof and an end closure member closing the open end of the container body. The container body is coated on its inner surface with a heat sealable thermoplastic material. The end closure member includes a peripheral flange coated on its outer surface with a heat sealable thermoplastic material. The peripheral flange and the marginal edge jointly provide a contacting portion where they are intimately fused and united together by the heat sealable thermoplastic material, and also provide a portion where they are held out of contact with each other, the latter portion being located adjacent to the turned edge of the flange. There are also provided a method and apparatus for sealing the liquid container with the end closure member.

10 Claims, 39 Drawing Figures

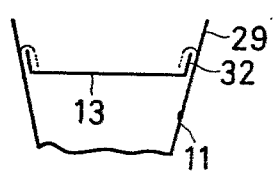
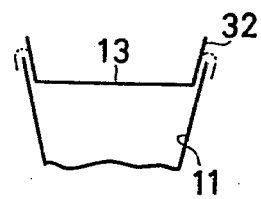
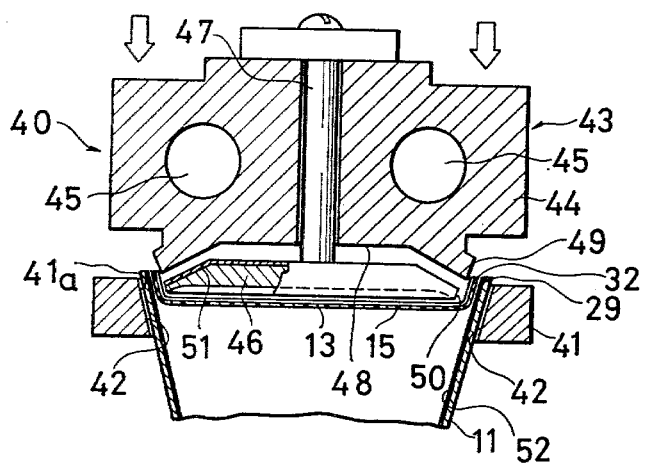
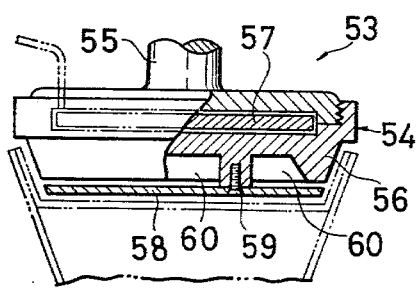
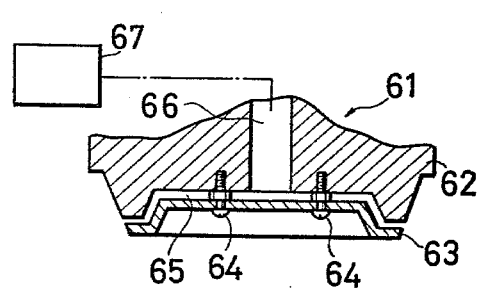

LIQUID CONTAINER SEALING CONSTRUCTION

This is a continuation of Ser. No. 965, 715 filed Dec. 1, 1978, which was a continuation of Ser. No. 886,383 filed Mar. 14, 1978, which was a continuation of Ser. No. 804, 212, filed June 7, 1977 which was a continuation of Ser. No. 670,107 filed Apr. 19, 1976, all now abandoned.

BACKGROUND OF THE INVENTION

1. Field of the Invention

This invention relates to a liquid container sealing construction.

2. Description of the Prior Art

Numerous container structures shaped like a cylinder, a cone or a prism have been developed and used over the past years for containing therein liquids having a relatively high pH and a high permeability, such as milk, juice, oil, liquor, cleanser, or lactic acid beverage. The container bodies have been usually constucted of paper coated on its inner surface with a liquid-tight material. The top and bottom open ends of the liquid container are sealed by suitable end closure members. Various attempts have been proposed to prevent leakage through a region where the end closure members are sealed to the container body. One such effort is to bond a flanged end closure to the inside wall of container body with an adhesive, as shown in FIG. 9A of the accompanying drawings. According to another proposal as shown in FIG. 9B, a marginal extension of the container body is turned inwardly over the joined flange of the end closure member like a seam of a can to provide a more rigid joining construction. A still further prior sealing structure is shown in FIG. 9C and comprises a flat end closure member heat sealed or otherwise coupled to a flange extending radially outwardly of the container body.

The sealing construction illustrated in FIG. 9B however requires a tedious and time consuming process and hence, has poor machinability. The construction shown in FIG. 9C involves a complicated procedure of forming the flange on the container body. Furthermore, the latter construction has the drawback that the projecting flange of the container is unsightly and requires a wide floor space when a multiplicity of containers are to be transferred or stored.

It has been heretofore found that the container sealing construction of FIG. 9A is most preferable from the standpoint of machinability. A prior art process for manufacturing this container sealing construction, however, cannot be carried out economically because completely liquid-tight sealing construction are unable to be produced at is mass production rate.

SUMMARY OF THE INVENTION

It is therefore a principal object of the invention to provide a liquid container sealing construction which is completely liquid-tight and pinhole free.

Another object of the invention is the provision of a method of producing the liquid container sealing construction.

A still further object of the invention is the provision of an apparatus for producing the liquid container sealing construction.

A still further object of the invention is to provide a method and apparatus for producing the liquid container sealing construction at a high rate of production.

According to the invention, there is provided a liquid container sealing construction comprising a container body having at least one open end surrounded by a marginal edge thereof and an end closure member closing the open end of the container body. The container body has on its inner surface a coating of a heat sealable thermoplastic material. The end closure member includes a peripheral flange having on its outer surface a coating of a heat sealable thermoplastic material. The peripheral flange and the marginal edge jointly provide a contacting portion where they are fused and intimately united together by the heat sealable thermoplastic material, and also provide a portion where they are held out of contact with each other, the latter portion being located adjacent to the turned edge of the flange.

There is provided a method of sealing the liquid container. The method comprises the steps of providing an end closure member larger in size than the open end of the container body, the end closure member including a peripheral portion having on its one surface a coating of a heat sealable thermoplastic material, pressing the end closure member into the opening with the coated surface of the closure member facing the open end of the container body, until the peripheral portion is formed into a flange by engagement with the marginal edge of the container body and is held in contact with the inner surface of the marginal edge of the container body, and heat sealing a portion of the flange to the marginal edge of the container body to provide a liquid-tight seal, the portion extending from the free edge of the flange to a point located short of the turned edge of the flange of the end closure.

According to the invention, there is also provided an apparatus for sealing the liquid container with the end closure member. The apparatus comprises a stationary holder having an opening therethrough, the opening providing a circumferential wall for retaining thereon the marginal edge of the container body of the liquid container, a first die having heater means disposed therein for heating the first die, and a second die supported centrally on the first die in substantially thermal-insulating relation therewith. The first and second dies jointly provide an actingsurface and are movable in the axial direction of the opening between a first portion where the dies are retracted away from the stationary holder and a second position where the acting surface presses the peripheral portion of the closure member and the marginal edge of the container body overlappingly against the circumferential wall of the holder opening while the first die is heated, whereby a portion of the peripheral portion of the end closure member is heat sealed to the marginal edge of the container body. The heat sealed portion extends from the free edge of the peripheral flange to a point located short of the turned edge of the peripheral flange of the end closure member.

Other objects, features and advantages of the present invention will appear more fully from the following description taken in connection with the accompanying drawings.

BRIEF DESCRIPTION OF THE DRAWINGS

FIGS. 17 and 18 are schematic views illustrative of modified end closure structures, respectively;

FIG. 19 is a fragmentary cross-sectional view of an apparatus constructed in accordance with the invention;

FIGS. 20 through 25 are fragmentary cross-sectional views showing other embodiments of the apparatus of the invention;

DETAILED DESCRIPTION OF THE PREFERRED EMBODIMENTS

Figure 1:
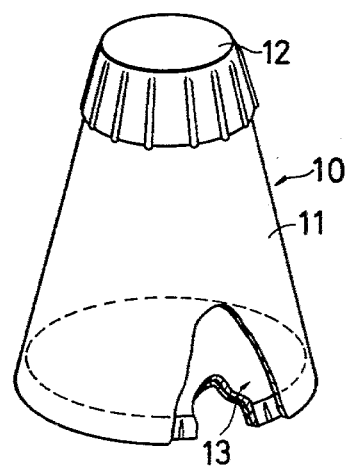
FIG. 1 is a perspective view with parts cut away of a liquid container sealed in accordance with the invention.
Figure 3:
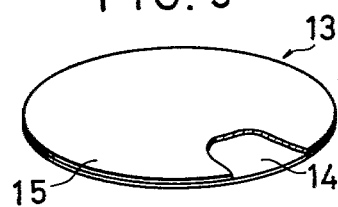
FIG. 3 is a perspective view of an end closure member of the invention with a coating of a heat sealable thermoplastic material partially removed for facility of illustration.
Figure 4:
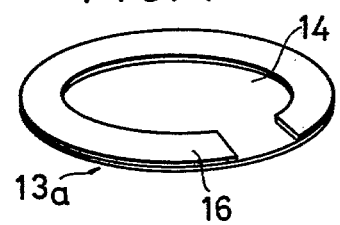
FIG. 4 is a view similar to FIG. 3 but showing another structure of an end closure member.

Referring now to FIG. 1, there is shown a liquid container generally designated at 10 and comprising a container body 11 having a shape of a hollow truncated cone and made, for example, of paper having on its surfaces polyethylene coatings, a cover 12 made of aluminum foil and covering a top end opening of the body 11, and an end closure member 13 closing a bottom end opening of the body 11. The end closure member 13 is formed of a disk-shaped base plate 14 coated on its one surface with a heat sealable thermoplastic material 15, as shown in FIG. 3. FIG. 4 shows a modified end closure member 13a in which the base plate 14 is provided on its marginal edge with an annular coating 16 of a heat sealable thermoplastic material. The base plate 14 is preferably made of paper, cellophane or aluminum foil. Alternatively, the base plate 14 may be made of a thermoplastic material such as nylon having a fusing point higher than that of the coating 15 or 16 of the heat sealable thermoplastic material.

Figure 2:
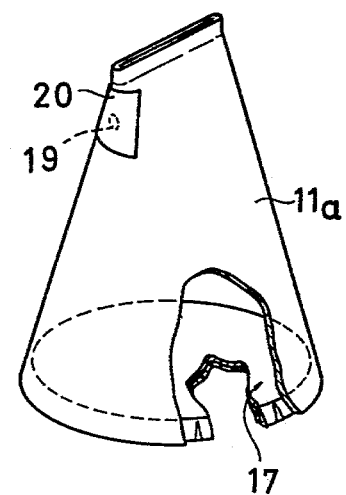
FIG. 2 is a view similar to FIG. 1 but showing another form of a liquid container.
Figure 5:
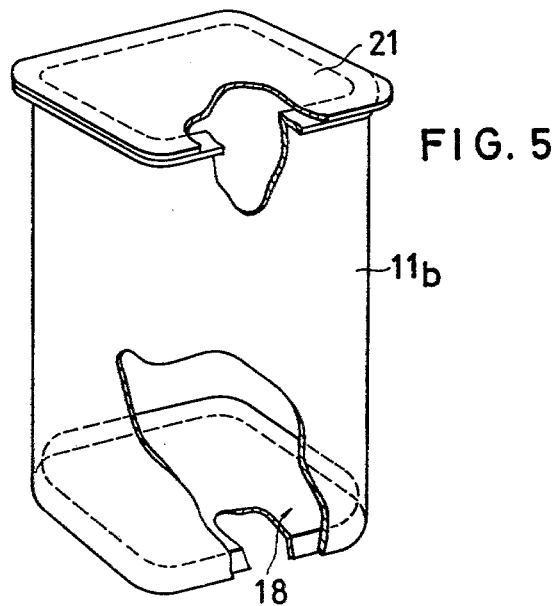
FIGS. 5 through 8 are perspective views, partially broken away, of a variety of liquid containers to which the principles of the invention are applicable.
Figure 6:
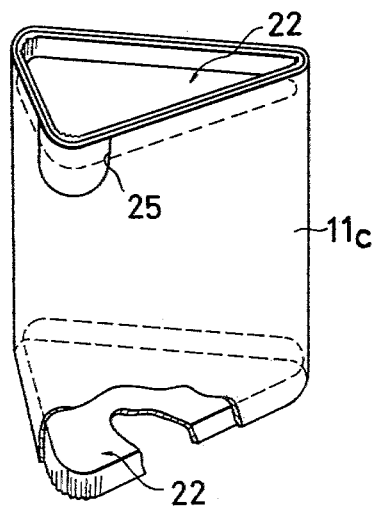
Figure 7:
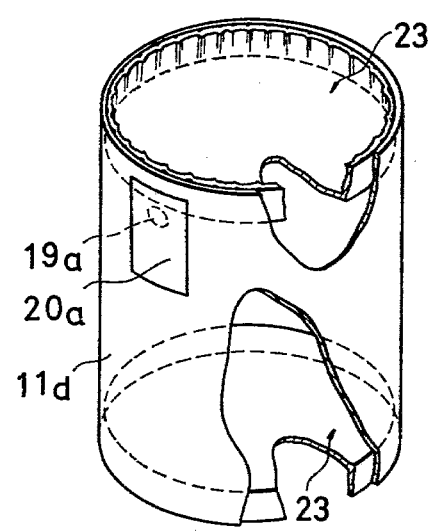
Figure 8:
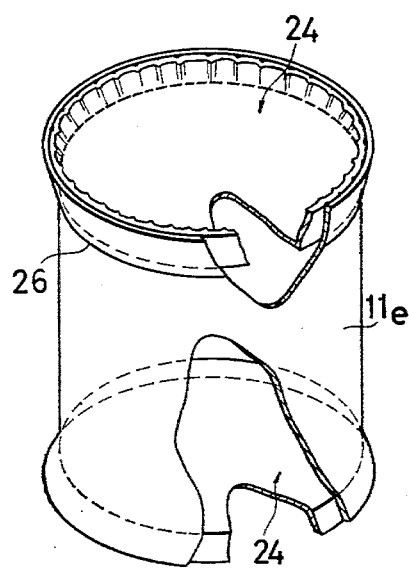
Figures 9A, 9B, 9C:
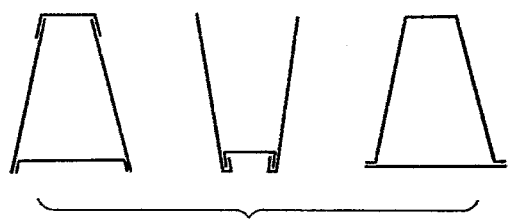
FIGS. 9A through 9C are schematic cross-sectional views showing constructions of prior art liquid containers.
Figure 10:
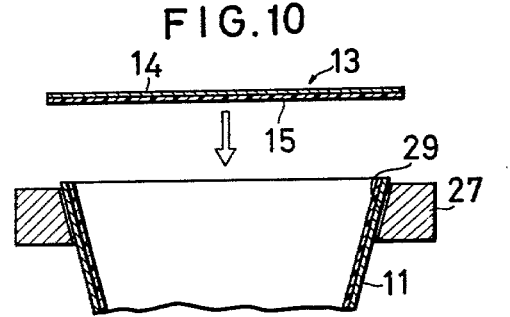
FIG. 10 is a fragmentary cross-sectional view illustrative of the way in which an open end of a liquid container body is closed off by an end closure member.

The principles of the present invention are applicable to a wide variety of liquid container structures such as shown in FIGS. 2, 5, 6, 7, and 8. In FIGS. 2 and 5, end closure members 17 and 18 are used for closing only bottom end openings of container bodies 11a and 11b, respectively. The body 11a shown in FIG. 2 is provided near its closed top end with a hole 19 through which a straw (not shown) is inserted into the interior of the container and which is normally covered with a seal member 20. The prism-shaped container body 11b of FIG. 5 is closed off by a cover 21. End closure members 22, 23 and 24 shown in FIGS. 6, 7 and 8, respectively, are used for closing both top and bottom end openings of container bodies 11c, 11d and 11e, respectively. Designated at 25 in FIG. 6 and at 26 in FIG. 8 are half cut lines to facilitate the opening of the liquid containers. The container body 11d has near the top end closure 23 a straw receiving hole 19a covered with a seal member 20a.

The heat sealable thermoplastic material coated on the base plate 14 is preferably polyethylene, polypropylene, vinyl chloride or vinylidene chloride. The end closure member 13 or 13a is provided, for example, by laminating a polyethylene film of a thickness of from 40 to 150 microns on a sheet of paper, by laminating polyethylene on cellophane, or by laminating polyethylene on metal foil such as aluminum foil. Otherwise, the end closure member may be a laminate of two kinds of plastics material, such as polyethylene and polypropylene, which have different fusing points.

Figure 11:
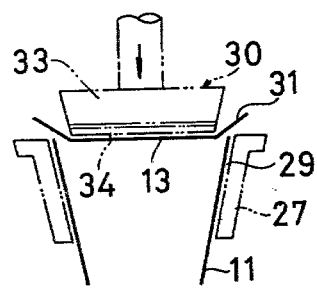
FIG. 11 is a schematic view showing the way in which the end closure member is being pressed by a die into the end opening of the container body.
Figure 12:
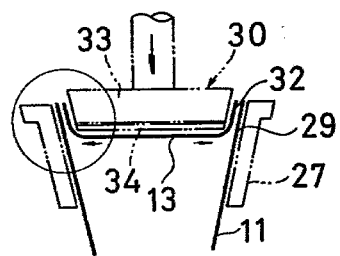
FIG. 12 is a view similar to FIG. 11 but showing the way in which the end closure member is heat sealed to the container body.
Figure 13:
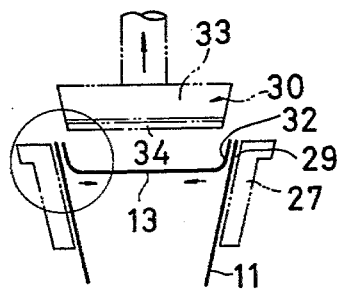
FIG. 13 is a view similar to FIG. 11 but showing the way in which the die is retracted away from the end closure member after the latter is joined to the container body.

A method of joining the end closure member 13 to the container body 11 will be described with reference to FIGS. 10 through 13. The end closure member 13 is formed by stamping out a suitable blank sheet (later described), the end closure member 13 being of a diameter larger than that of an open end of the container body 11 which is to be closed off. The end closure member 13 is arranged with its coated surface directed toward the open end of the container body 11 which in turn is held in place by a stationary holder 27. More specifically, the holder 27 has an opening 28 formed therethrough and having a tapered circumferential wall for retaining thereon a marginal edge 29 surrounding the open end of the container body 11. FIGS. 11 through 13 illustrate sequential operations in which the end closure member 13 is heat sealed by a sealing head 30 to the marginal edge 29 of the container body 11.

In FIG. 11, the sealing head 30 presses the end closure member 13 down into the open end of the container body 11 with a peripheral portion 31 of the closure member 13 engaged by the marginal edge 29 of the body 13 supported on the holder 27. As the sealing head 30 depresses the end closure member 13 further, the peripheral portion 31 is formed into a flange 32 shown in FIG. 12, during which time the sealing head 30 is heated so as to heat seal the flange 32 of the end closure member 13 to the inner surface of the marginal edge 29 of the container body 11. When the joining of the end closure member 13 to the container body 11 is completed, the sealing head 30 is raised away from the container 10 as shown in FIG. 13.

According to an important aspect of the invention, the sealing head 30 is comprised of a first die 33 having suitable heater means (later described) and a second die 34 supported on the first die 33 in substantially thermal-insulating relation therewith. Thus, the peripheral flange 32 and the marginal edge 29 provide a contacting portion 35 where they are fused and intimately united together by heating the heat sealable thermoplastic material under pressure, and a portion 36 where they are held out of contact with each other, the portion 36 being located adjacent to a turning edge 37 of the flange 32, as shown in FIGS. 14A and 15.

Figures 16A, 16B:
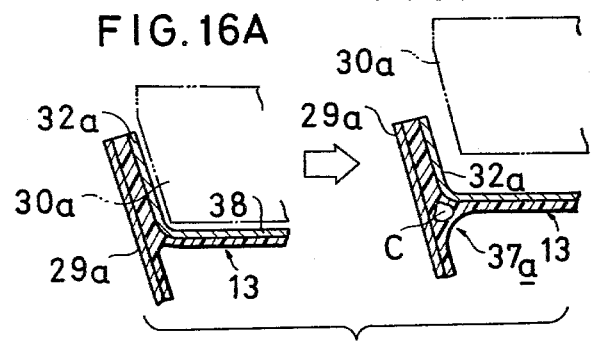
FIGS. 16A and 16B are views similar to FIGS. 14A and 14B, respectively, but illustrating the construction of a prior art liquid container.

The heat sealing operation according to the invention will be described in comparison with a conventional process which is illustrated schematically in FIGS. 16A and 16B. According to the prior art process, the end closure member 13 is depressed by a sealing head 30a which is wholly heated. While the end closure member 13 is thrust into the open end of the container body 11, the end closure member 13 is held under tension, when the entire coated surface of the flange 32a is heated by the sealing head 30a so as to be bonded to the marginal edge 29a of the container body 11. Upon completion of the heat sealing of the end closure member 13, the sealing head 30a is retracted upwardly away from its lowered position whereupon a flat bottom portion 38 rises slightly to relieve the tension applied thereto. The intimately fused thermoplastic material at the turning edge 37a is then subjected to excessive tension which tends to produce cavities C in the thermoplastic material, as shown in FIG. 16B. The excessive tension further causes the heat sealable material at the turning edge 37a of the flange 32a to be torn off from the end closure member 13 and the container body 11, resulting in the reduced bonding strength of the united end closure member 13. Furthermore, the cavities C thus produced are liable to form pinholes through the heat sealable thermoplastic material between the flange 32 and the marginal edge 29. An additional disadvantage attendant with this prior art procedure is that the wholly heated sealing head 30a heats the flat bottom portion 38 of the base plate 14, so that water contained in the base plate 14 produces moisture which is then moved into the heat sealable thermoplastic material and forms bubbles in the fused thermoplastic material at a position that is located adjacent to the united portion and held under a relatively low pressure. These bubbles are also prone to cause the foregoing drawbacks.

Figures 14A, 14B:
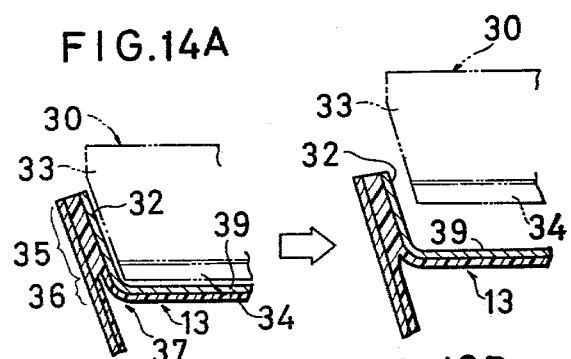
FIG. 14A is an enlarged cross-sectional view of a portion encircled in FIG. 12.
FIG. 14B is an enlarged cross-sectional view of a portion encircled in FIG. 13.
Figure 15:
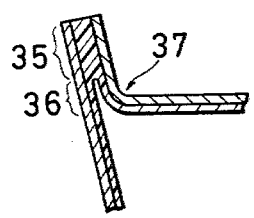
FIG. 15 is an enlarged fragmentary cross-sectional view showing the end closure member heat sealed to the liquid container body.

With the process according to the invention, however, the portion 36 and flat bottom portion 39 of the end closure member 13 are held only under pressure and prevented from being heated because of the second die 34, as shown in FIG. 14A. When the sealing head 30 is raised away from the end closure member 13 and the bottom portion 39 of the closure member 13 is moved upwardly slightly to relieve the tension applied thereto, the unjoined portion 36 of the end closure flange 32 takes up the upward movement of the bottom portion 39 of the end closure member 13. Therefore, the heat sealable thermoplastic material at the turned edge 37 of the flange 32 is prevented from producing cavities therein or being torn off.

FIG. 17 shows a further process to finish the end closure member 13. The end closure member 13 is so held in place that the marginal edge 29 of the container body 11 extends beyond the flange 32 of the end closure member 13. The extended marginal edge 29 is then turned inwardly over the free edge of the flange 32 for joining with an uncoated surface of the flange 32. In FIG. 18, the end closure member 13 is so held in place that the free edge of the flange 32 extends beyond the marginal edge 29 of the container body 11. The extended free edge of the flange 32 is then turned outwardly over the marginal edge 29 of the container body 11 for joining with an outer surface of the container body 11.

In accordance with the invention, an apparatus is also provided for sealing the liquid container 10 with the end closure member 13. In FIG. 19, the apparatus is generally indicated by a reference numeral 40 and comprises a stationary holder 41 having an opening 41a therethrough which provides a tapered circumferential wall 42 for retaining thereon the marginal edge 29 of the container body 11. The apparatus 40 also has a sealing head 43 comprising a first die 44 having a cartridge heater 45 disposed therein for heating the first die 44, and a second die 46 disposed beneath and supported centrally on the first die 44 by a slidable center rod 47, the second die 46 being devoid of heater means and movable vertically toward and away from the first die 44. More specifically, the second die 46 is shaped like a disk and is normally spaced apart from the bottom face 48 of the first die 44 so as to be held in substantially thermal-insulating relationship therewith. When the sealing head 40 is lowered to effect heat sealing operation, the second die 46 comes into contact with the bottom face 48 of the first die 44 in order to jointly provide a peripheral acting surface consisting of a first peripheral surface 49 of the first die 44 and a second peripheral surface 50 of the second die 46. Thus, the sealing head 40 is movable in the axial direction of the opening 41a between a first position where the sealing head 40 is retracted away from the stationary holder 41 and a second position where the peripheral acting surface presses the peripheral flange 32 of the end closure member 13 and the marginal edge 29 of the container body 11 in overlapped relation against the tapered circumferential wall 42 of the holder 41, while the first die 44 is heated by the cartridge heater 45. The second peripheral surface 50 of the second die 46 thus provides the portion 36 where a portion of the flange 32 which is located adjacent to its turning edge 37 is held out of contact with the marginal edge 29 of the container body 11. Preferably, the second die 46 is provided on its top surface with an electroplated layer 51 so as to reflect heat from the second die 44 when the first and second dies 44 and 46 are held in contact with each other.

Figure 29:
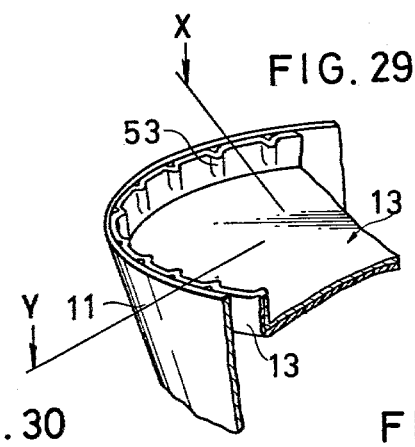
FIG. 29 is an enlarged fragmentary view, in perspective, of a liquid container sealing construction according to the invention.

When the overlapped flange 32 and marginal edge 29 are heated under pressure by means of the peripheral surface 49 of the first die 44, the coating 15 on the end closure member 13 and the coating 52 on the container body 11 which contacts the coating 15 are fused and intimately united to each other, thereby bonding the flange 32 to the marginal edge 29 firmly. As shown in FIG. 29, wrinkles 53 formed on the end closure flange 32 render the bonding strength more rigid because the thermoplastic material when fused enters spaces in the wrinkles 53.

FIG. 20 shows an apparatus 53 constructed in accordance with another embodiment of the invention, the apparatus 53 comprising a sealing head 54 supported on a drive rod 55. The sealing head 54 has a first die 56 with a plate-like heater 57 disposed therein and a second die 58 located beneath and secured to the first die 56 by means of screws 59, the second die 58 being preferably made of a suitable thermal insulating material such as asbestos. There are provided spaces 60 between the first and second dies 56 and 58 to hold the second die 58 in substantially thermal-insulating relationship with the first die 56. According to another modified apparatus 61 shown in FIG. 21, a first die 62 carries a second die 63 fixed thereto by bolts 64 with an air gap 65 provided therebetween, the first die 62 having a central hole 66 defined therethrough and communicating with the air gap 65. A blower 67 is connected to the central hole 66 so as to flow air through the air gap 65 to cool the second die 63 forcibly.

Figure 22:
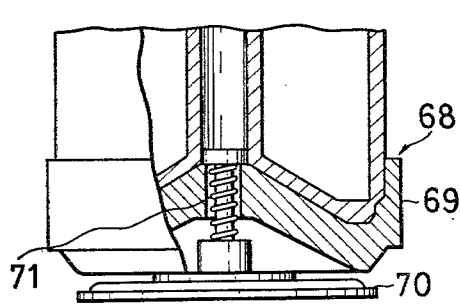

A sealing head 68 illustrated in FIG. 22 is provided with a first die 69 and a second die 70 supported on the first die 69 by a compression spring 71, the second die 70 being normally spaced apart from the first die 69 by the spring 71. When the sealing head 68 presses the end closure member 13 downwardly, the second die 70 can increase pressure on the end closure member 13 under the influence of the compression spring 71.

Figure 23:
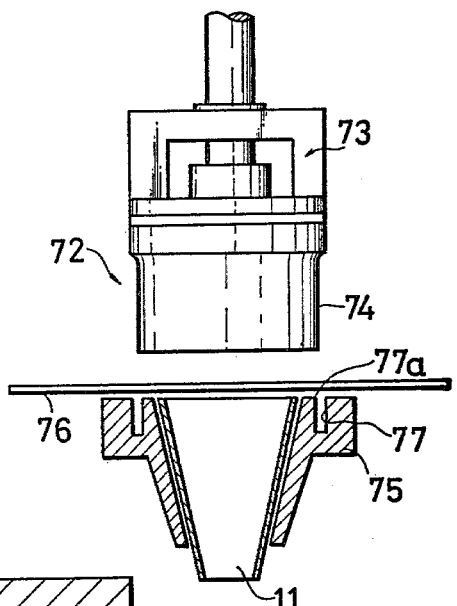

A still further embodiment of the apparatus of the invention is illustrated in FIS. 23 and 24. In FIG. 23, there is shown a general arrangement of the apparatus 72 which comprises a sealing head 73 carrying thereon an annular cutter 74, and a stationary holder 75 for retaining the container body 11 therethrough. Between the sealing head 73 and the stationary holder 75, there is an elongate blank sheet 76 from which the end closure member 13 is formed by the annular cutter 74. More specifically, the holder 75 has an upwardly opening annular slot 77 to provide an edge 77a engageable with the blade of the cutter 74. While the sealing head 73 is lowered, the annular cutter 74 severs the end closure member 13 from the blank strip 76 and then, the sealing head 73 heat seals the end closure member 13 to the marginal edge 29 of the container body 11, the structural details of the sealing head 73 being shown in FIG. 24.

Figure 24:
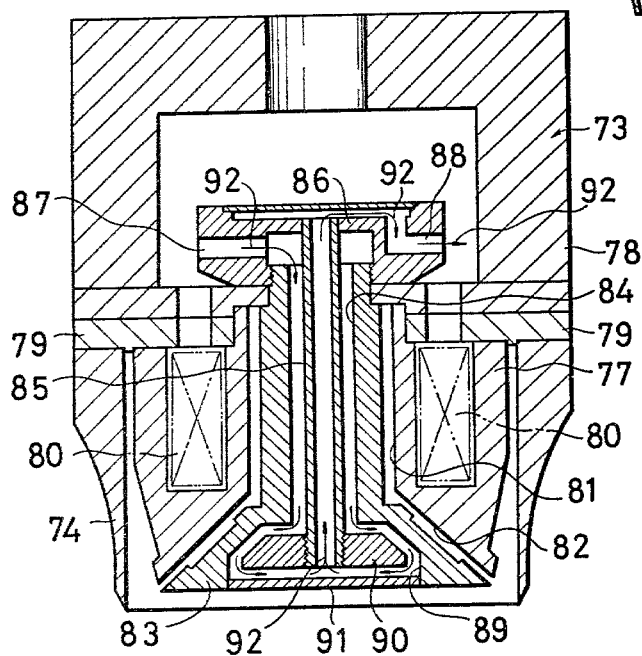

Referring to FIG. 24, the sealing head 73 includes a first die 77 supported on a frame 78 through a thermal insulating member 79 and having heater means 80 disposed therein. The first die 77 has a central bore 81 flared downwardly at 82. A second die 83 is disposed in the central bore 81 and has a central chamber 84 defined therein and containing a conduit 85 which is supported by a cap-like support 86 on the frame 78. The support 86 has an inlet port 87 communicating with the chamber 84, the conduit 85 and an outlet port 88 in the support 86. The chamber 84 has a large-diameter chamber 89 which accommodates a disk plate 90 fixed to the bottom end of the conduit 85, thereby providing a tortuous flow of water for cooling the second die 83. The large-diameter chamber 89 is closed off by a plate member 91 that serves as the bottom of the second die 83. The second die 83 is thus cooled by directing a flow of water in a direction shown by the arrows 92 in FIG. 24. The blade of the annular cutter 74 is disposed lower than the second die 83.

Figure 25:
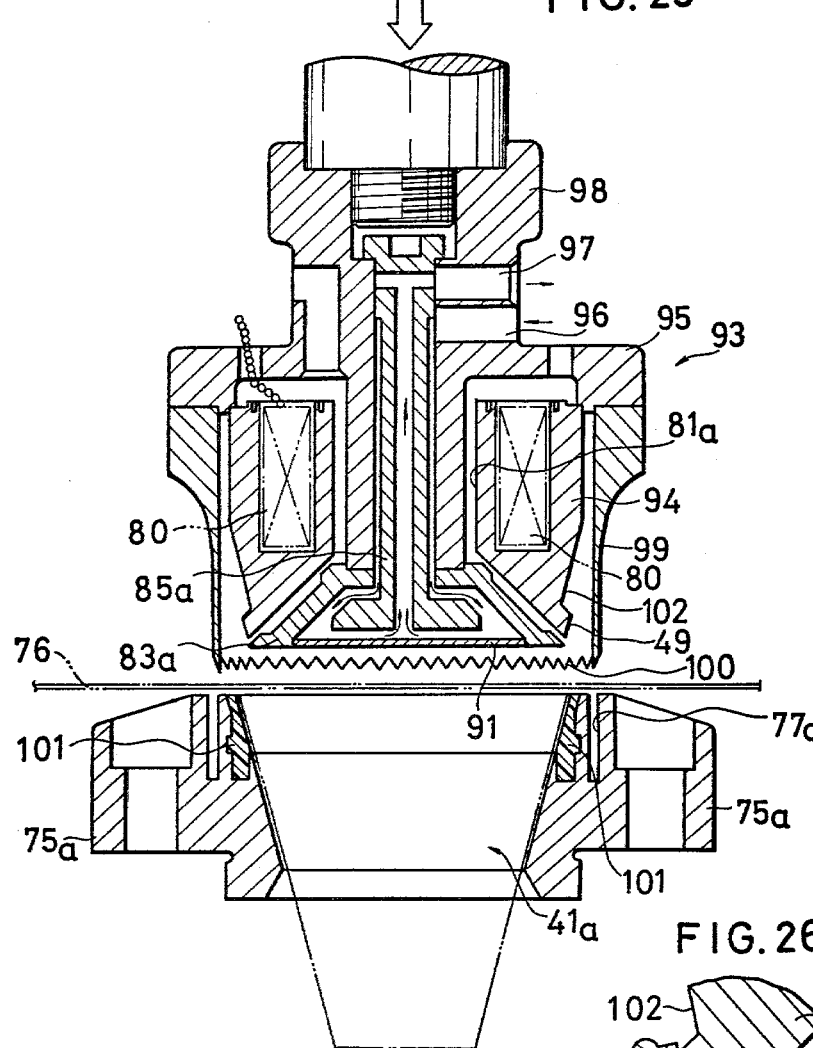

A modified apparatus 93 shown in FIG. 25 is substantially the same as the apparatus 72 of FIG. 24. However, the overall size of the apparatus 93 is rendered relatively compact by incorporating some structural features described below. First, a first die 94 is supported directly on a frame 95 with no thermal insulating member interposed therebetween. With this construction, when the first and second dies 94 and 85a are to be assembled together, these die members can be easily put into exact coaxial relationship to each other. Furthermore, inlet and outlet ports 96 and 97 are formed in a neck portion 98 of the frame 95. An annular cutter 99 carried on the frame 95 in surrounding relation to the first and second dies 94 and 83a has a serrate blade 100 for facilitating the cutting of the end closure member 13 out of the blank sheet 76. The stationery holder 75a is provided with an annular elastomeric member 101 disposed on the circumferential wall of the central opening 41a for supporting thereon the marginal edge 29 of the container body 11 of the liquid container 10. With the elastomeric supporting member 101, the end closure member 13 can be joined to the container body 11 with utmost precision even if the first and second dies 94 and 83a are slightly out of axial adjustment with the opening 41a in the holder 75a.

Figure 26:
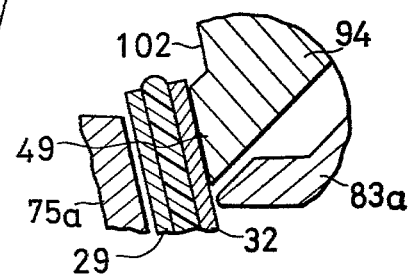
FIG. 26 is an enlarged fragmentary cross-sectional view of a sealing head construction in the apparatus shown in FIGS. 19, 24 and 25.

As better shown in FIG. 26, the first die 94 is also provided with the peripheral surface 49 projecting from an outer surface 102 of the first die 94. The projecting surface 49 is advantageous in that the outer surface 102 is kept away from the fused thermoplastic material forced out of between the flange 32 of the end closure member 13 and the marginal edge 29 of the container body 11, which fused thermoplastic material would otherwise be caused to attach on and contaminate the outer surface 102 of the first die 94 over extended periods of time.

Figure 27:
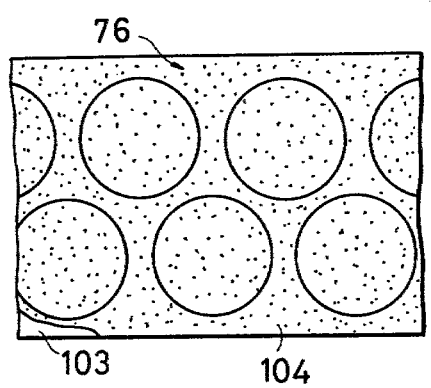
FIG. 27 is a fragmentary plan view of an elongate blank sheet used for providing end closure members.
Figure 28:
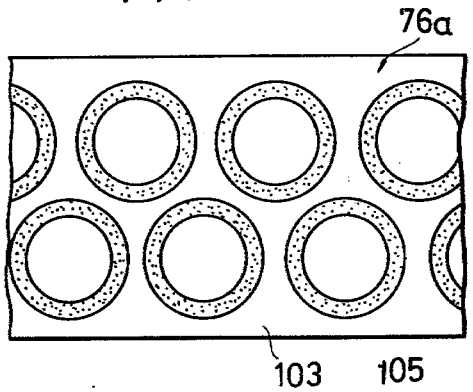
FIG. 28 is a view similar to FIG. 27 but showing a modification of an elongate blank sheet.

The elongate blank sheet 76 is illustrated in FIG. 27. The blank sheet 76 comprises a base plate 103 coated on its one surface with a heat sealable thermoplastic material 104. A plurality of end closure members 13 shown in FIG. 3 are formed from this blank sheet 76. A modified blank sheet 76a illustrated in FIG. 28 includes the base plate 103 having on its one surface annular coatings 105 of a heat sealable thermoplastic material. This blank sheet 76a is able to provide a plurality of end closure members 13a shown in FIG. 4. With the elongate blank sheet 76 or 76a, the end closure member 13 or 13a can be formed in succession by feeding the blank strip 76 or 76a intermittently under the annular cutter 74 or 99 with the coated surface of the blank sheet directed towards the container body 11, and by punching the end closure members 13 or 13a out of the blank sheet 76 or 76a so that the individual end closure 13 or 13a will have a diameter larger than that of the open end of the container body 11 which is to be closed off. The severed end closure member 13 or 13a is then depressed by the sealing head, during which time the positioning of the end closure member 13 or 13a with respect to the container body 11 is effected by the annular cutter 74 or 99 engaging the periphery of the end closure member 13 or 13a.

Figure 30:
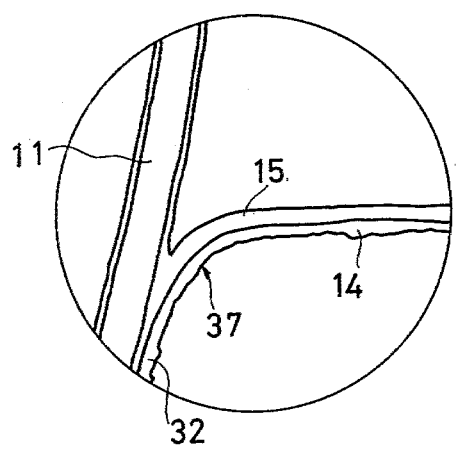
FIG. 30 is a microscopic view of a portion where the end closure member is heat sealed to the container body in accordance with the invention.
Figure 31:
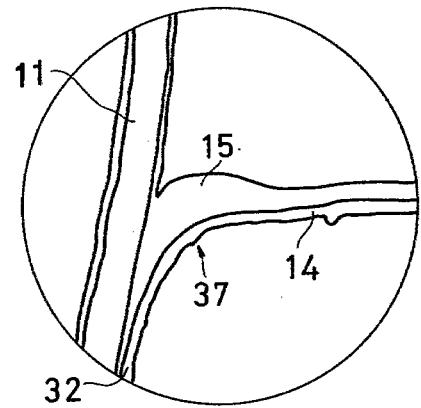
FIG. 31 is a view similar to FIG. 30 but showing the end closure member joined to the container body under different conditions.
Figure 32:
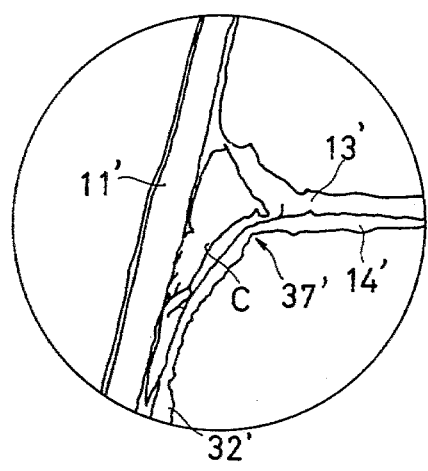
FIGS. 32 and 33 are views similar to FIG. 30 but showing portions where the end closure member is joined to the container body by a conventional apparatus.
Figure 33:
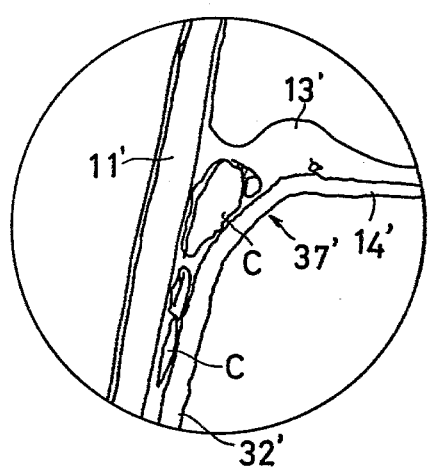

Comparison of a container sealing construction according to the present invention with a prior art one will be described with reference to FIGS. 29 through 33. FIGS. 30 and 31 are 20 times magnified views of sections taken along line X of FIG. 29 illustrating a container sealing construction of the invention. FIGS. 32 and 33 are similar views showing sections of a conventional sealing construction, the sections being taken along lines similar to lines X and Y of FIG. 29. Conditions under which these container sealing constructions are produced are as follows:

TABLE I

|  |  | Sealing construction shown in FIG. 30 | Sealing construction shown in FIG. 31 | Sealing constructions shown in FIGS. 32 and 33 |
|---|---|---|---|---|
| Container body | Paper ($g/m^2$) | 200 | 200 | 200 |
|  | Polyethylene coating on each surface (micron) | 40 | 40 | 40 |
| End closure member | Paper ($g/m^2$) | 60 | 60 | 60 |
|  | Polyethylene coating (micron) | 80 | 120 | 120 |
| Weight on the sealing head (kg) |  | 100 | 100 | 100 |
| Sealing temperature (Centigrade) |  | 180° | 150° | 150° |
| Sealing time (Second) |  | 1.5 | 3 | 3 |
| Sealing head cooling system |  | Water cooled | Air cooled | — |

Remarks:
The water-cooled sealing head was cooled by circulating water at a temperature of 20° C. and at a flow rate of 0.5 liter/minute. The sealing constructions of FIGS. 32 and 33 were formed by the sealing head schematically shown in FIGS. 16A and 16B, the sealing head being wholly heated. The liquid containers used were of a frusto-conical shape having a side wall inclined at 30°, the volume of the containers being 70 cc and the diameter of the end closure member being 50 mm.

As clearly shown in FIGS. 30 and 31, the sealing constructions of the invention have the thermoplastic material uniformly united adjacent to the turned edge 37 of the flange 32 of the end closure member 13. The prior container sealing construction of FIGS. 32 and 33 have cavities C formed in the thermoplastic material adjacent to the turned edge 37' of the flange 32'. The container body 11 is liable to be exposed due to the cavities and pinholes are easy to be formed through the thermoplastic material.

Figure 34:
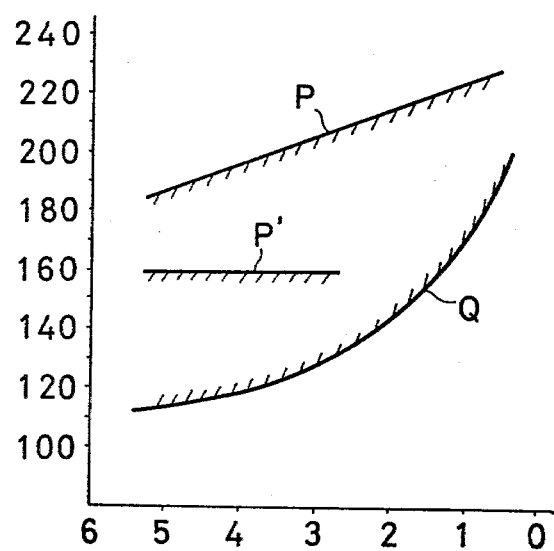
FIG. 34 is a graph showing a relation between temperatures at which heat sealing is effected and intervals of time during which heat sealing is effected.

A relation between sealing temperature and sealing time is shown in FIG. 34 under the following conditions:

TABLE II

|  | Base plate used | Plastics material coated on outer surface | Plastics material coated on inner surface to be heat sealed |
|---|---|---|---|
| Container body | Paper (200 $g/m^2$) | Polyethylene layer (30 microns) | Polyethylene layer (40 microns) |
| End closure member | Paper (80 $g/m^2$) | — | Polyethylene layer (100 microns) |

Remarks:
Air-cooled and water-cooled sealing heads were used. The latter sealing head was cooled by circulating water at a temperature of 20° C. and at a flow rate of 0.5 liter/minute.

A heat sealing process according to the invention can be suitably conducted in the area between lines P and Q of FIG. 34 if the water-cooled sealing head is used, and in the area between lines P' and Q if the air-cooled sealing head is used. As shown in FIG. 34, a high sealing temperature allows the process to be accomplished in a reduced interval of sealing time. When the sealing process is to be conducted at a high sealing temperature, then the water-cooled sealing head must be employed because the second die to be cooled tends to become heated by the first die.

An advantage resulting from the sealing head of the invention is that the cooled second die permits of a considerably high sealing temperature of the first die, with the results that sealing time per liquid container can be minimized so as to increase the rate of production of the liquid containers.

While the invention has been described in connection with specific embodiments thereof, various modifications thereof will occur to those skilled in the art without departing from the scope of the invention as set forth in the appended claims.

What is claimed is:

1. A liquid container sealing construction comprising:
   (i) a container body having at least one open end surrounded by a marginal portion thereof, said container body having on its inner surface a coating of a heat sealable thermoplastic material, and
   (ii) an end closure member closing said open end of the container body, said end closure member including a base and a peripheral flange extending from a turning edge bounding said base, said peripheral flange having on its outer surface a coating of a heat sealable thermoplastic material, said peripheral flange and said marginal portion jointly providing a first zone, remote from said turned edge, where said flange and said marginal portion are fused and intimately united together by said heat sealable thermoplastic material, said peripheral flange and said marginal portion further jointly providing a second zone, adjacent said turned edge, where said flange and said marginal portion are held out of contact with each other, whereby upon completion of heat sealing together of said peripheral flange and said marginal portion at said first zone, said peripheral flange and said marginal portion may move relatively one with respect to the other at said second zone to permit said base to move relative to said container body for relieving tension applied thereto during heat sealing.

2. A liquid container sealing construction according to claim 1, in which said end closure member is further provided with a coating of a heat sealable thermoplastic material continguous to that on said flange.

3. A liquid container sealing construction according to claim 1, in which said container body is in the form of a truncated cone, said open end of the container body being a larger-diameter end of the truncated cone, and said end closure member being circular.

4. A liquid container sealing construction according to claim 1, said container body and said end closure member being made of paper.

5. A liquid container sealing construction according to claim 1, said container body and said end closure member being made of a plastics material.

6. A liquid container sealing construction according to claim 1, said container body and said end closure member being made of cellophane.

7. A liquid container sealing construction according to claim 1, said container body and said end closure member being made of nylon.

8. A liquid container sealing construction according to claim 1, said container body and said end closure member being made of aluminium.

9. A liquid container sealing construction according to claim 1, in which said heat sealable thermoplastic material is a synthetic resin selected from the group consisting of polyethylene, polypropylene, vinyl chloride and vinylidene chloride.

10. A liquid container sealing construction according to claim 9, said coating having a thickness of from 40 to 150 microns.

* * * * *